United States Patent
Takagi et al.

(10) Patent No.: US 7,736,803 B2
(45) Date of Patent: Jun. 15, 2010

(54) NON-AQUEOUS ELECTROLYTE SECONDARY BATTERY

(75) Inventors: Ryosuke Takagi, Fukushima (JP); Hiroyuki Suzuki, Chiba (JP); Hiroshi Imoto, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/181,669

(22) Filed: Jul. 29, 2008

(65) Prior Publication Data
US 2009/0047580 A1    Feb. 19, 2009

(30) Foreign Application Priority Data
Aug. 15, 2007   (JP) .............................. 2007-211892

(51) Int. Cl.
H01M 2/02   (2006.01)
H01M 2/26   (2006.01)
H01M 10/36  (2006.01)

(52) U.S. Cl. ........................ 429/211; 429/94; 429/164

(58) Field of Classification Search .................... None
See application file for complete search history.

(56) References Cited

U.S. PATENT DOCUMENTS 7,273,678 B2 *   9/2007   Akita et al. ................. 429/211
7,364,817 B2 *   4/2008   Lee ............................. 429/161

FOREIGN PATENT DOCUMENTS

| JP | 59-044766 | 3/1984 |
|----|-----------|--------|
| JP | 2000-277154 | 10/2000 |
| JP | 2001-256952 | 9/2001 |
| JP | 2002-015722 | 1/2002 |
| JP | 3684561 | 5/2005 |
| JP | 3680797 | 6/2005 |
| JP | 2006-040902 | 2/2006 |

* cited by examiner

Primary Examiner—John S Maples
(74) Attorney, Agent, or Firm—K&L Gates LLP

(57) ABSTRACT

A non-aqueous electrolyte secondary battery is provided and includes a battery element in which a positive electrode having a positive electrode active material layer provided on a positive electrode collector and a negative electrode having a negative electrode active material layer provided on a negative electrode collector are stacked via a separator, and an edge of the negative electrode is disposed so as to protrude along the planar direction relative to an edge of the positive electrode. A positive electrode terminal is connected to the positive electrode, and a negative electrode terminal is connected to the negative electrode. The negative electrode terminal has a contact piece intersecting with the continuous direction of the edge of the negative electrode and intersecting with the planar direction of the negative electrode. The contact piece comprehensively cleaves and contacts a plurality of the edges of the negative electrode.

8 Claims, 11 Drawing Sheets

NON-AQUEOUS ELECTROLYTE SECONDARY BATTERY

CROSS REFERENCES TO RELATED APPLICATIONS

The present application claims priority to Japanese Patent Application JP 2007-211892 filed in the Japan Patent Office on Aug. 15, 2007, the entire contents of which being incorporated herein by reference.

BACKGROUND

Specifically, the present disclosure relates to a non-aqueous electrolyte secondary battery using a non-aqueous electrolyte and having a battery element of a wound structure or a stack structure such as laminate type lithium ion batteries, rectangular lithium ion batteries and cylindrical lithium batteries.

In a non-aqueous electrolyte secondary battery, a battery element is formed by stacking a positive electrode having a positive electrode active material layer provided on a positive electrode collector and a negative electrode having a negative electrode active material layer provided on a negative electrode collector via a separator (see, for example, Japanese Patent No. 3680797).

In the related-art non-aqueous electrolyte secondary batteries, for the purpose of connecting a positive electrode terminal and a negative electrode terminal to a positive electrode and a negative electrode, respectively, an uncoated part in which a positive electrode active material is not coated in a positive electrode collector and an uncoated part in which a negative electrode active material is not coated on a negative electrode collector are required. Therefore, there is involved a problem that it takes a lot of time to manufacture the positive electrode and the negative electrode, resulting in high manufacturing costs.

Then, it is desirable to provide a non-aqueous electrolyte secondary battery capable of reducing the manufacturing costs.

SUMMARY

The present disclosure relates to a non-aqueous electrolyte secondary battery having a battery element having a positive electrode and a negative electrode stacked therein via a separator, in which a positive electrode terminal is connected to the positive electrode, and a negative electrode terminal is connected to the negative electrode.

According to an embodiment, there is provided a non-aqueous electrolyte secondary battery including a battery element in which a positive electrode having a positive electrode active material layer provided on a positive electrode collector and a negative electrode having a negative electrode active material layer provided on a negative electrode collector are stacked via a separator, and an edge of the negative electrode is disposed so as to protrude along the planar direction relative to an edge of the positive electrode. A positive electrode terminal connected to the positive electrode, and a negative electrode terminal connected to the negative electrode. The negative electrode terminal has a contact piece intersecting with the continuous direction of the edge of the negative electrode and intersecting with the planar direction of the negative electrode. The contact piece comprehensively cleaving and contacting a plurality of the edges of the negative electrode.

Here, examples of the battery element include: a wound-type battery element in which a positive electrode and a negative electrode are wound in a stacked state; and a stack type battery element in which a positive electrode and a negative electrode are alternately stacked.

The edge of the negative electrode as referred to herein refers to a portion protruding against the positive electrode. In case of a wound-type battery element, for example, a desired form may be obtained by winding a positive electrode and a negative electrode having the same width dimension while being deviated from each other in the width direction, or a desired form may be obtained by using a negative electrode having a width wider than a positive electrode.

Examples of the contact piece include: a contact piece in a cutlery shape which cuts up plural negative electrodes comprehensively from edges thereof along the planar direction (width direction); and a contact piece in a tapered shape which comprehensively penetrates plural negative electrodes in the width direction.

In such an embodiment, since the negative electrode is cloven by the contact piece of the negative electrode terminal, the contact piece surely comes in contact with a metal base material of a negative electrode collector constituting the negative electrode.

Therefore, in providing a negative electrode active material layer on the negative electrode collector, it is not necessary to form an uncoated part in which the negative electrode active material is not coated on the negative electrode collector. Accordingly, it is possible to reduce manufacturing costs as compared with the related art.

Also, according to such an embodiment, it is desirable that the contact piece cleaves the negative electrode from the edge along the planar direction and comes into contact therewith.

In such an embodiment, since the contact piece cleaves the negative electrode from the edge along the planar direction, a cleavage site in which the metal base material of the negative electrode collector has appeared upon being cloven by the contact piece surely comes into contact with the both side surfaces of the contact piece.

Accordingly, since a contact area between the negative electrode collector and the contact piece can be increased, it is possible to enhance current collection efficiency.

Furthermore, according to the embodiment, it is desirable that the contact piece is provided in a plural number and that the contact pieces are disposed in parallel to each other.

In the embodiment, since the plural contact pieces are disposed in parallel to each other, a contact area of the contact piece with the negative electrode collector can be much more increased.

Also, in the embodiment, it is desirable that the contact piece penetrates the negative electrode in the thickness direction.

In such an embodiment, since the contact piece penetrates the negative electrode in the thickness direction, the metal base material of the negative electrode collector appears on the inner surface of a through-hole formed in the negative electrode, and the outer surface of the contact surface comes into contact with this inner surface. Thus, not only it is possible to surely bring the contact piece into contact with the negative electrode collector, but also it is possible to increase a contact area of the contact piece with the negative electrode collector.

Furthermore, according the embodiment, it is desirable that the positive electrode active material layer has a first positive electrode and a second positive electrode provided on one surface of the positive electrode collector; that the negative electrode active material layer is provided on the both surfaces of the negative electrode collector; and that the first positive electrode, the negative electrode and the second positive electrode are stacked and then wound such that the positive electrode active material layer and the negative electrode active material layer are faced on each other via the separator.

In the embodiment, by using a one surface-coated electrode, problems of the process are solved. If an electrode in which coating is achieved on the surface of only one side different between at the time of starting coating and at the time of finishing coating is prepared, when after coating the surface, the back surface is coated, the coating thickness is different between the case where an active material layer exists on the surface and the case where an active material layer does not exist on the surface. Thus, either one surface must be peeled away later. On the other hand, by using a one surface-coated electrode, it is not necessary to achieve coating in a pattern form; it is possible to cut out uniformly coated electrodes and combine them; and it is possible to make it adaptive to a difference in size and to eliminate a usefulness process such as peeling away.

In accordance with the non-aqueous electrolyte secondary battery according to the embodiment, by making the contact piece of the negative electrode terminal cleave the negative electrode and bringing the contact piece into contact with a cloven site, there are brought effects that not only the negative electrode terminal can be surely connected to the negative electrode collector via the contact piece, but the current collection efficiency can be enhanced.

Additional features and advantages are described herein, and will be apparent from the following Detailed Description and the figures.

DETAILED DESCRIPTION

The non-aqueous electrolyte secondary batteries according to embodiments are hereunder described with reference to the accompanying drawings.

First Embodiment

Figure 1:
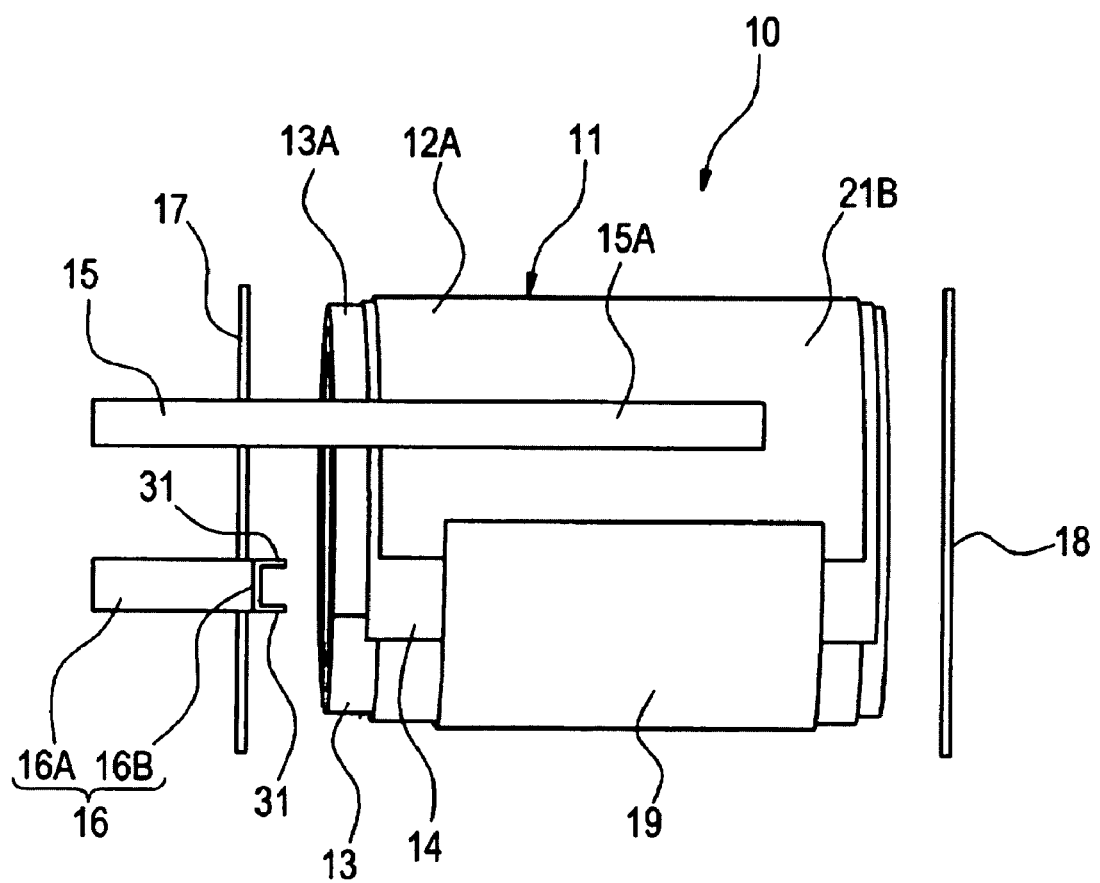
FIG. 1 is a side view illustrating a non-aqueous electrolyte secondary battery according to a first embodiment.
Figure 2:
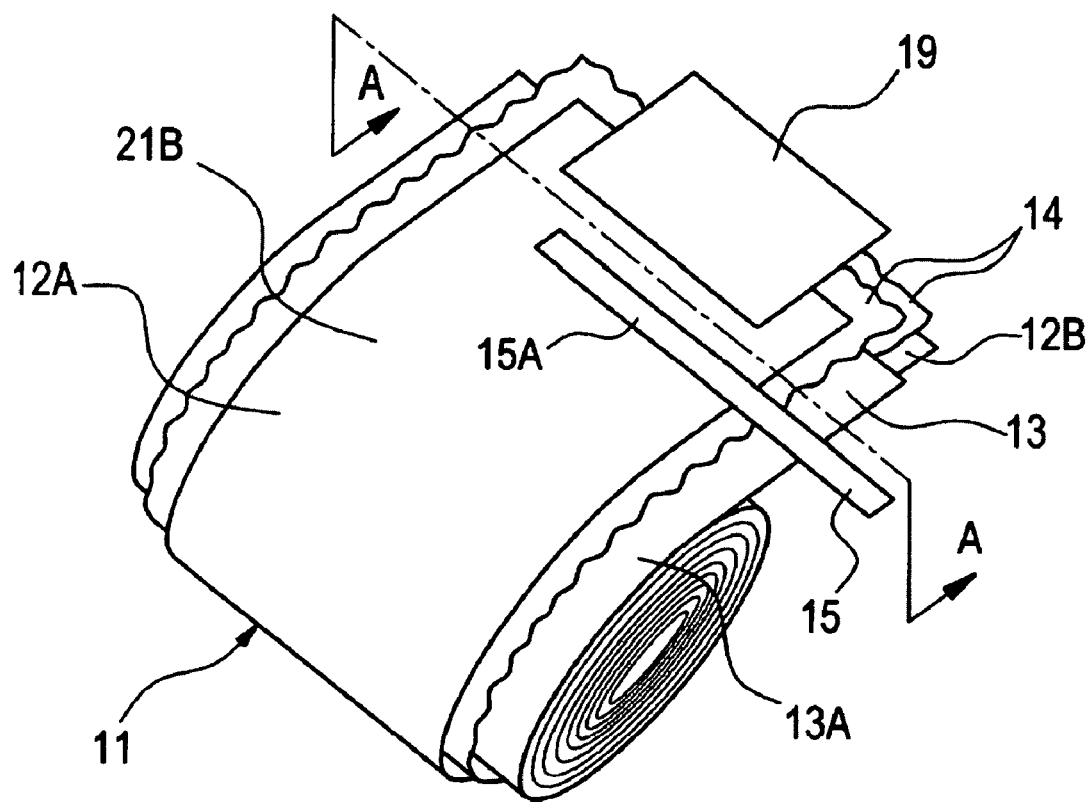
FIG. 2 is a perspective view illustrating a battery element provided in the non-aqueous electrolyte secondary battery of the first embodiment.

As illustrated in FIGS. 1 to 2, a non-aqueous electrolyte secondary battery 10 according to a first embodiment has a battery element 11 in which a first positive electrode 12A, a second positive electrode 12B and a negative electrode 13 are wound in a stacked state via a separator 14. A positive electrode terminal 15 is connected to the positive electrode 12A. A negative electrode terminal 16 is connected to the negative electrode 13. A top insulator 17 supports the positive electrode terminal 15 and the negative electrode terminal 16 and is facing on one end surface (left-hand side in FIG. 1) of the battery element 11. A bottom insulator 18 is facing on the other end surface (right-hand side in FIG. 1) of the battery element 11. The battery element 11 is sealed by a cylindrical laminate pack (not illustrated).

Figure 3:
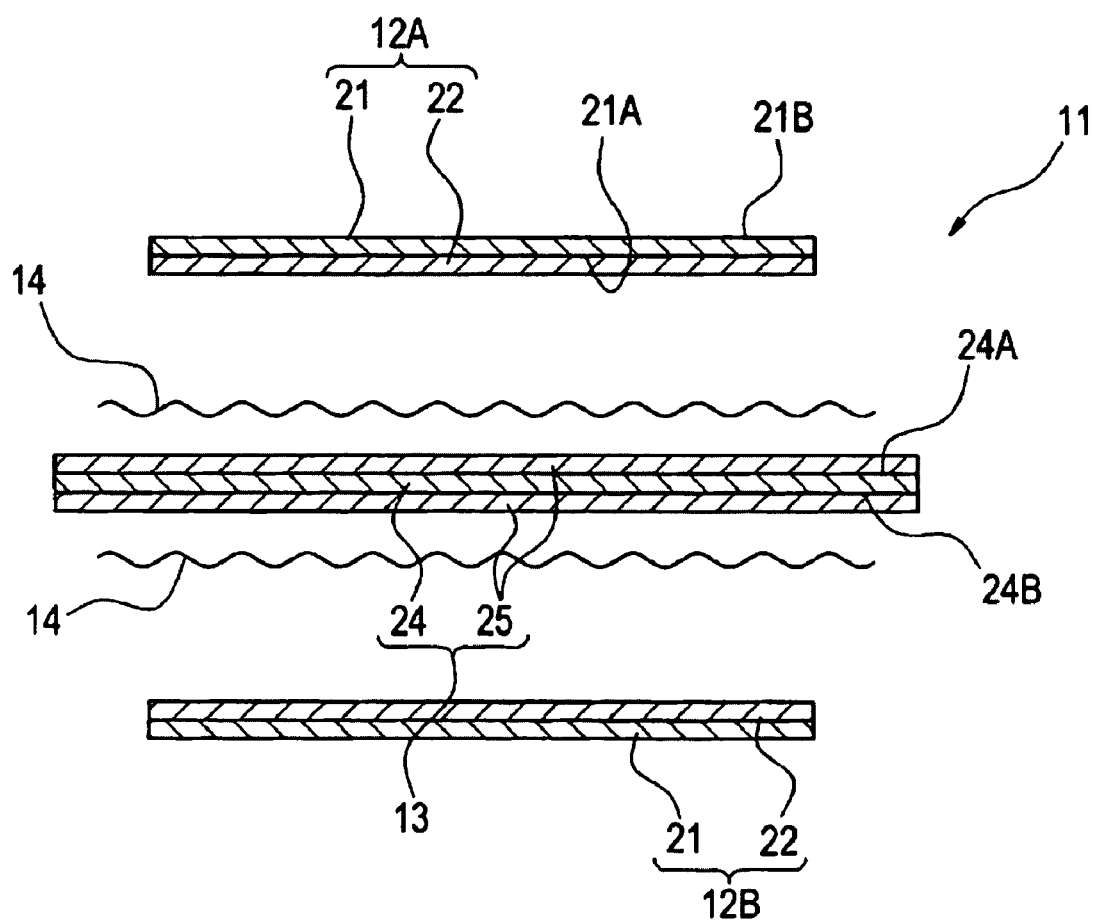
FIG. 3 is an A-A line cross-sectional view of FIG. 2.

As illustrated in FIG. 3, in each of the first positive electrode 12A and the second positive electrode 12B, a positive electrode active material layer 22 is uniformly coated on one surface of a positive electrode collector (aluminum foil) 21.

In the negative electrode 13, a negative electrode active material layer 25 is uniformly coated on each of both surfaces 24A and 24B of a negative electrode collector (copper foil). This negative electrode 13 is formed such that its width dimension is larger than that of the first positive electrode 12A and the second positive electrode 12B.

The separator 14 is an insulating sheet mediated between the positive electrode 12 and the negative electrode 13. The separator 14 is formed such that its width dimension is smaller than that of the negative electrode 13 and larger than that of the positive electrode 12.

Returning to FIGS. 1 and 2, in the positive electrode terminal 15, a base part 15A is welded on a non-coated surface 21B where the positive electrode active material 22 in the positive electrode collector 21 of the first positive electrode 12A is not coated.

In the battery element 11, the first positive electrode 12A, the separator 14, the negative electrode 13, the separator 14 and the second positive electrode 12B are stacked in this order, and thereafter, the stack is wound in such a manner that the non-coated surface 21B in the positive electrode collector 21 of the first positive electrode 12A forms an outermost surface and that the positive electrode terminal 15 is exposed.

The first positive electrode 12A and the second positive electrode 12B are aligned such that the positive electrode active material layer 22 faces on the negative electrode 13.

This battery element 11 is a wound-type battery element in which an end (end of winding) of the first positive electrode 12A is fixed by an adhesive tape 19.

In this battery element 11, since the width dimension of the negative electrode 13 is larger than that of the first positive electrode 12A, the second positive electrode 12B and the separator 14, an edge 13A of the negative electrode 13 protrudes along the winding axis line relative to edges of the first positive electrode 12A and the second positive electrode 12B.

Figure 4:
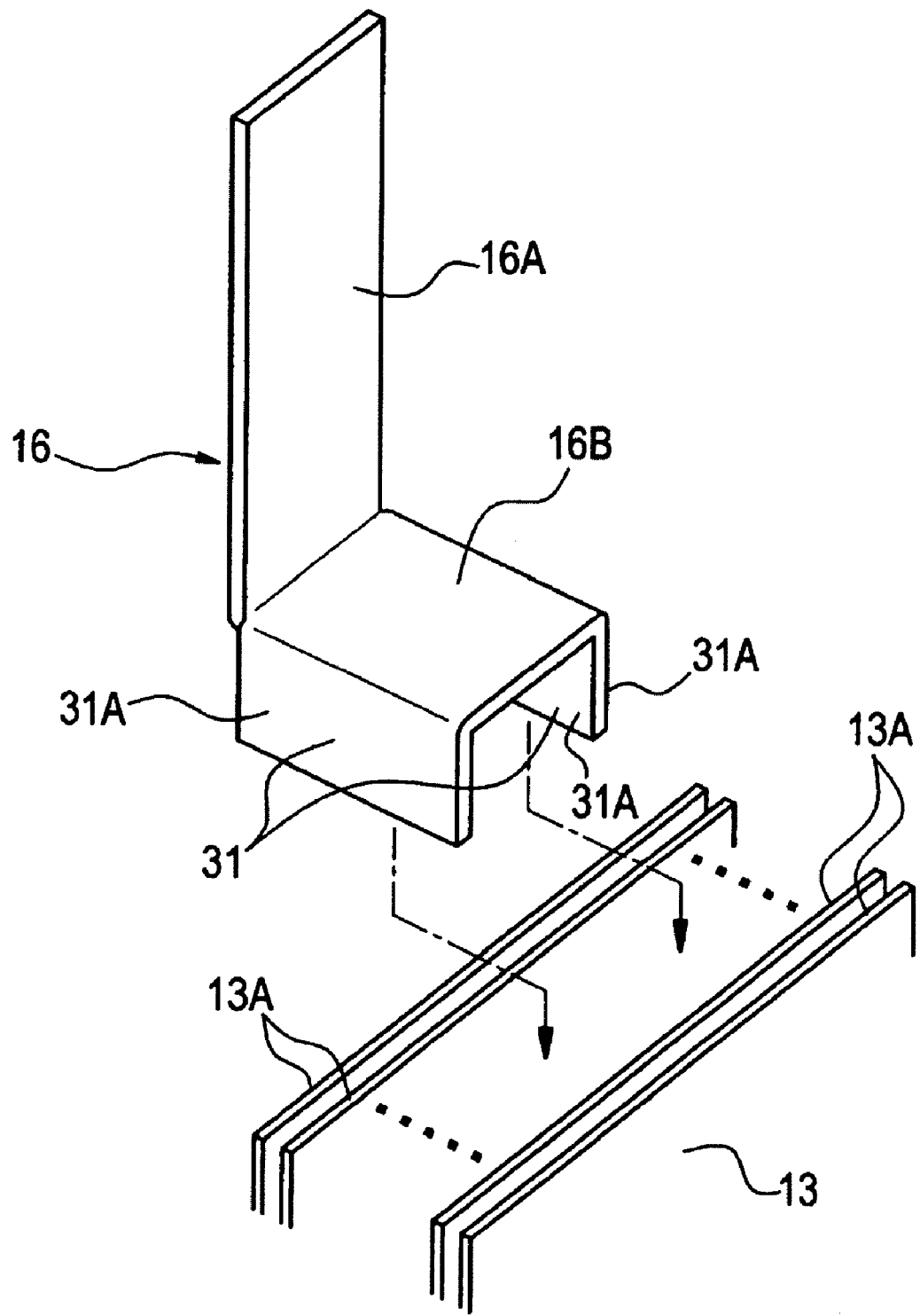
FIG. 4 is a perspective view illustrating a negative electrode terminal of the first embodiment.

As illustrated in FIG. 4, the negative electrode terminal 16 is shaped in a substantially strip form and has a terminal part 16A and a base part 16B bent such that they are substantially orthogonal with each other. The base part 16B is shaped in a substantially U-shaped form having a pair of contact pieces 31 bent such that they are substantially orthogonal with the base part 16B.

The contact piece 31 has a length extending over plural layers of the edges 13A disposed such that they are stacked upon winding of the negative electrode 13.

Figure 5A:
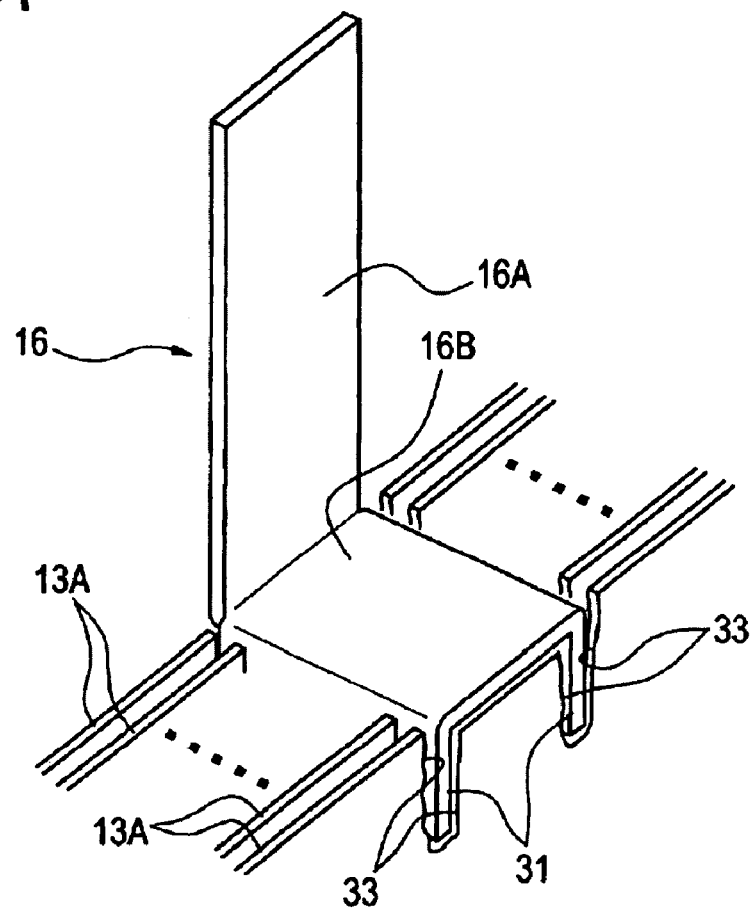
FIG. 5A is a perspective view illustrating an embodiment in which an edge of a negative electrode is cloven by the negative electrode terminal of the first embodiment.

The negative electrode terminal 16 is disposed such that the longitudinal direction of the respective contact piece 31 intersects with the continuous direction of the edge 13A of the negative electrode 13 and intersects with the planar direction (width direction) of the negative electrode 13. When the negative electrode terminal 16 is pressed from this state along the planar direction (width direction) of the negative electrode 13, the respective contact piece 31 comprehensively cleaves the negative electrode 13 from the edge 13A to a prescribed position along the planar direction (the state in FIG. 5A).

Figure 5B:
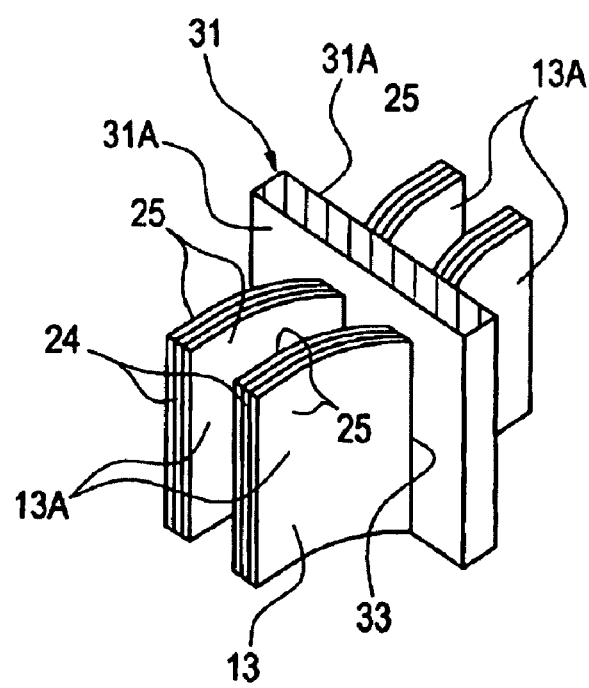
FIG. 5B is a perspective view illustrating another embodiment in which an edge of a negative electrode is cloven by the negative electrode terminal of the first embodiment.

Here, as illustrated in FIG. 5B, a cleavage site 33 formed in the negative electrode 13 by the contact piece 31 is shaped in a groove form, and a cleavage edge of the cleave site 33 comes into contact with both side surfaces 31A of the contact piece 31 in a curved state.

According to this, the both side surfaces 31A of the contact piece 31 come into contact with the cleavage site 33 where a negative electrode collector (copper foil) 24 of the negative electrode 13 is exposed, and thereby the negative electrode terminal 16 obtains continuity with the negative electrode 13.

According to the non-aqueous electrolyte secondary battery 10 of the foregoing first embodiment, the pair of contact pieces 31 cleaves the negative electrode 13 from the edge 13A, and the negative electrode terminal 16 comes into contact with the negative electrode collector 24 of the negative electrode 13, thereby obtaining continuity. Therefore, it is not necessary to previously provide the negative electrode 13 with an uncoated part as in the related art. According to this, it is possible to reduce manufacturing costs as compared with the related art.

Also, according to the non-aqueous electrolyte secondary battery 10 of the first embodiment, since the contact piece 31 of the negative electrode terminal 16 cleaves the negative electrode 13 from the edge 13A along the planar direction as if it cuts up the negative electrode 13 with a knife, the both side surfaces of the contact piece 13 surely come into contact with the negative electrode collector 24, thereby obtaining satisfactory current collection efficiency.

Furthermore, according to the non-aqueous electrolyte secondary battery 10 of the first embodiment, since the negative electrode terminal 16 has the pair of contact pieces 31 which are in parallel to each other, not only the contact piece 31 is able to surely come into contact with the negative electrode collector 24 between these contact pieces 31, but also its contact area with the negative electrode collector 24 can be much more increased.

Figure 6A:
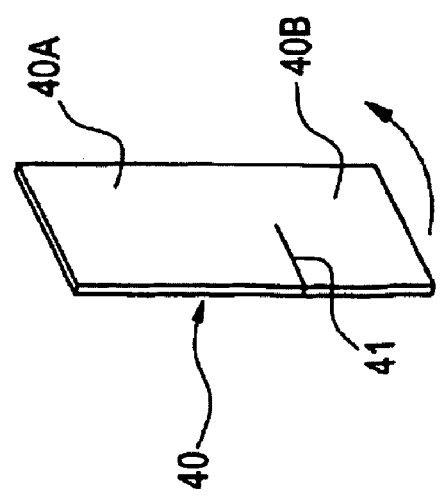
FIGS. 6A to 6C are each a perspective view illustrating a modification example of the negative electrode terminal of the first embodiment.
Figure 6B:
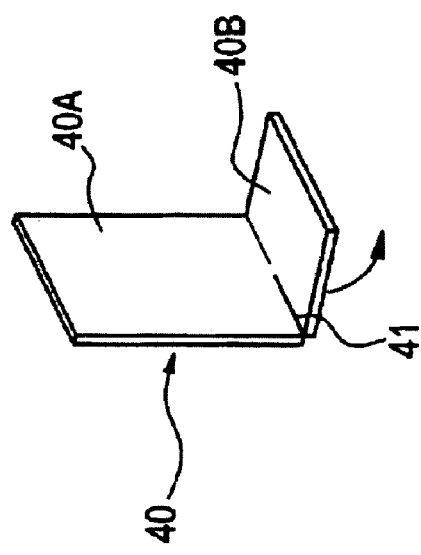
Figure 6C:
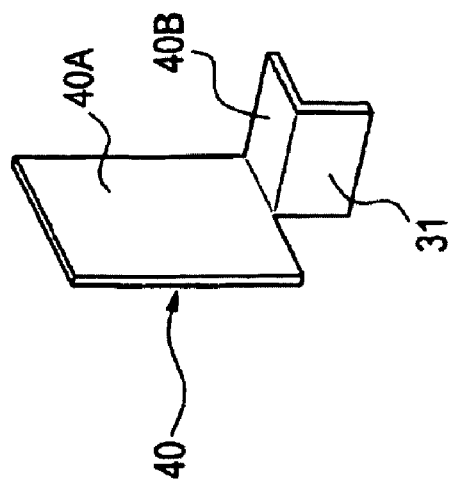

While in the first embodiment, the negative electrode terminal 16 having a pair (plurality) of contact pieces 31 has been exemplified, a form in which only one contact piece 31 is provided as in a negative electrode terminal 40 as illustrated in FIGS. 6A to 6C is included in an embodiment.

One example of a method for manufacturing this negative electrode terminal 40 is hereunder described.

First of all, a slit 41 is formed along a boundary line between a terminal part 40A and a base part 40B of the negative electrode terminal 40 shaped in a strip form (see FIG. 6A); the base part 40B is bent at about 90 degrees in an arrow direction from the boundary between the terminal part 40A and the base part 40B (see FIG. 6B). Subsequently, the base part 40B is bent at about 90 degree in an arrow direction while defining a line extending from an end point of the slit 41 along the longitudinal direction of the negative electrode terminal 40 as a boundary line in the base part 40B, thereby obtaining the contact piece 31 (see FIG. 6C). Next, second to fourth embodiments are described with reference to FIGS. 7 to 11.

In the second to fourth embodiments, the same members as in the non-aqueous electrolyte secondary battery 10 of the first embodiment are given the same symbols used in the first embodiment, and descriptions thereof are omitted.

Second Embodiment

Figure 7:
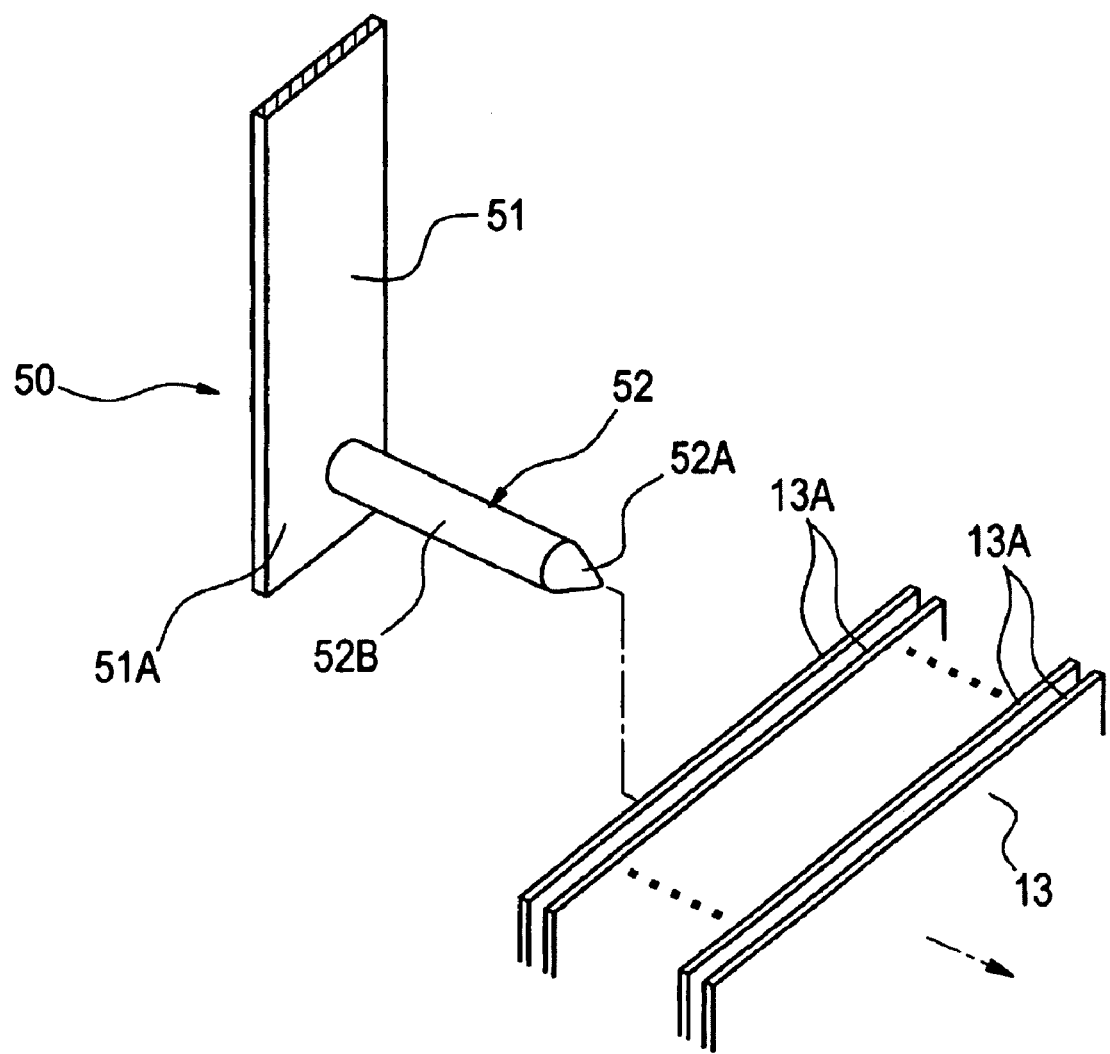
FIG. 7 is a perspective view illustrating a negative electrode terminal of a second embodiment.
Figure 8:
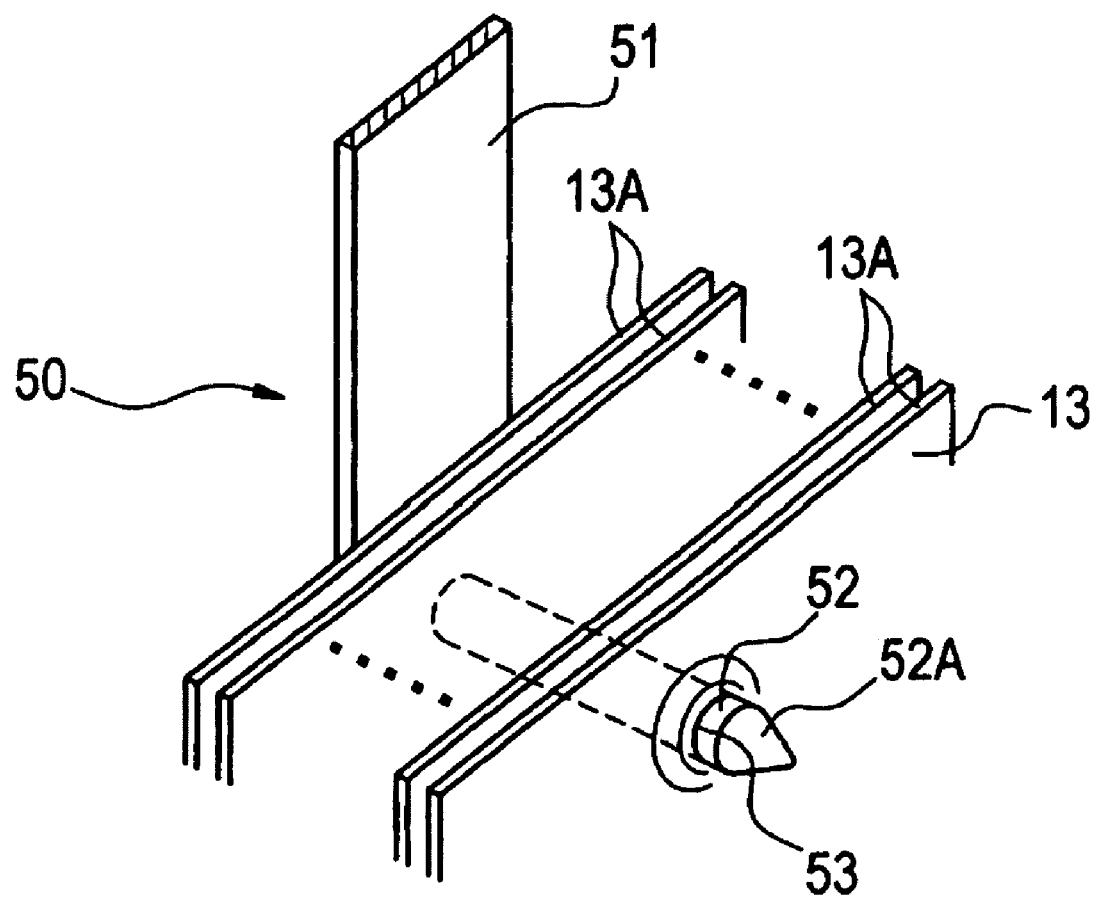
FIG. 8 is a perspective view illustrating a state that an edge of a negative electrode is cloven by a negative electrode terminal of a non-aqueous electrolyte secondary battery according to a second embodiment.

In a non-aqueous electrolyte secondary battery 50 of the second embodiment as illustrated in FIGS. 7 to 8, a contact piece 52 is provided in an end 51A of a negative electrode terminal 51.

The contact piece 52 is extended along the thickness direction of the negative electrode terminal 51 and is shaped in a columnar form with a taper-shaped tip part 52A. The length in the longitudinal direction of this contact piece 52 is a length extending plural layers of edges 13A disposed such that they are stacked upon winding of the negative electrode 13.

In this non-aqueous electrolyte secondary battery 50, the contact piece 52 of the negative electrode terminal 51 comprehensively penetrates the edge 13A of the negative electrode 13 in the thickness direction.

On that occasion, a through-hole as a cleavage site 53 is formed by the contact piece 52 in the edge 13A of the negative electrode 13, and a negative electrode collector (copper foil) 24 of the negative electrode 13 is exposed on the inner surface of the through-hole. In consequence, in the negative electrode terminal 51, at least a part of a peripheral surface 52B of the contact piece 52 comes into contact with the inner peripheral surface of the through-hole as the cleavage site 53 where the negative electrode collector 24 of the negative electrode 13 is exposed, thereby obtaining continuity with the negative electrode 13.

According to the non-aqueous electrolyte secondary battery 50 of the foregoing second embodiment, the contact piece 52 comprehensively penetrates the edge 13A of the negative electrode 13 along the thickness direction, thereby obtaining continuity between the negative electrode terminal 51 and the negative electrode 13. Therefore, likewise the foregoing first embodiment, it is not necessary to previously provide the negative electrode 13 with an uncoated part. According to this, it is possible to reduce manufacturing costs as compared with the related art.

Also, according to the non-aqueous electrolyte secondary battery 50 of the second embodiment, since the contact piece 52 penetrates the edge 13A of the negative electrode 13, even when the negative electrode terminal 51 and the negative electrode 13 are relatively moved due to vibration or the like, the contact piece 52 does not fall off from the through-hole as the cleavage site 53. According to this, it is possible to surely keep continuity between the negative electrode terminal 51 and the negative electrode 13.

Third Embodiment

Figure 9:
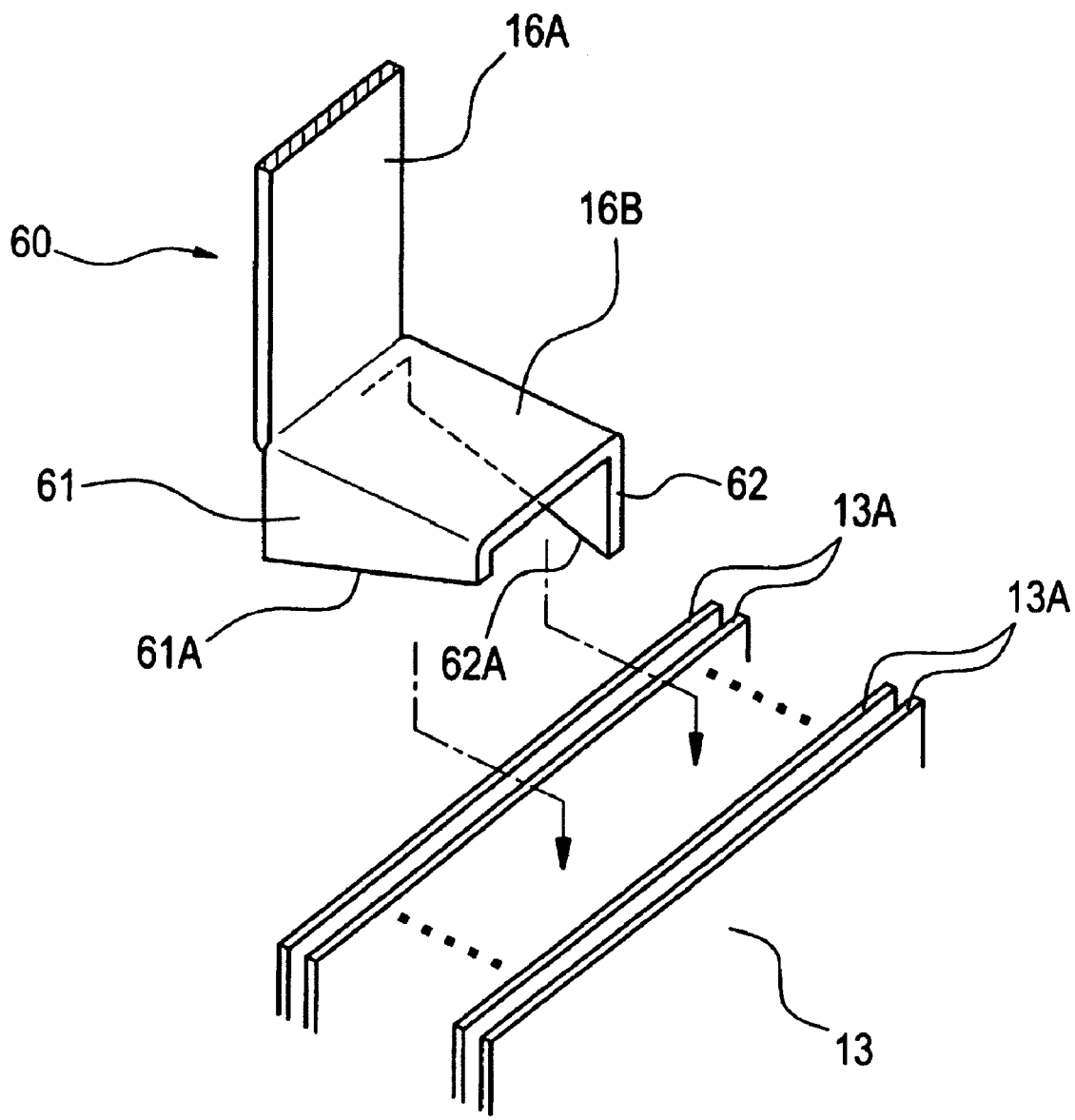
FIG. 9 is a perspective view illustrating a negative electrode terminal of a non-aqueous electrolyte secondary battery according to a third embodiment.

In a non-aqueous electrolyte secondary battery of a third embodiment as illustrated in FIG. 9, a pair of contact pieces 61 and 62 is provided in place of the pair of contact pieces 31 in the first embodiment, and other configurations are the same as in the non-aqueous electrolyte secondary battery 10 of the first embodiment.

In the contact piece 61, a lower side 61A is formed in a rising gradient toward the direction of the far side from a terminal part 16A. In the contact piece 62, a lower side 62A is formed in a rising gradient toward the direction of the near side to the terminal part 16A.

Figure 10:
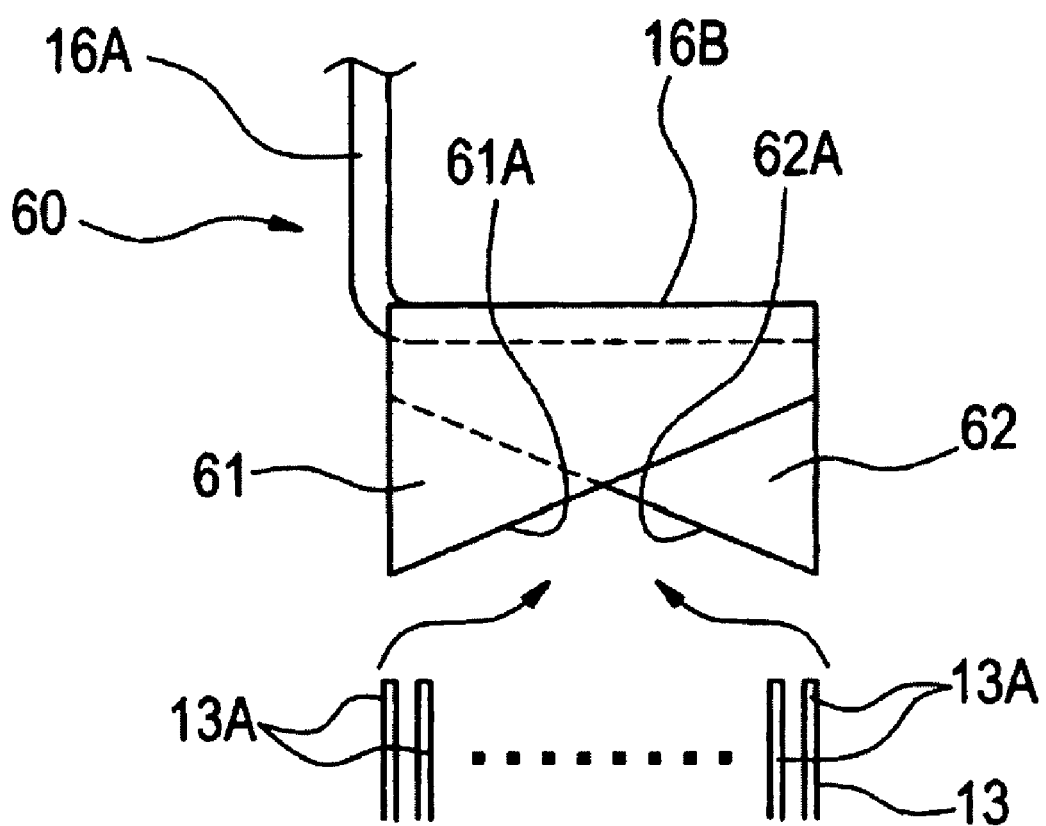
FIG. 10 is a side view illustrating the negative electrode terminal of the third embodiment.

As illustrated in FIG. 10, in the negative electrode terminal 60, when a negative electrode 13 is cloven from an edge 13A along the planar direction of the negative electrode 13 by the contact pieces 61 and 62, the lower side 61A of the contact piece 61 is able to guide the edge 13A of the negative electrode 13 in a right arrow direction in FIG. 10. The lower side 62A of the contact piece 62 is able to guide the edge 13A of the negative electrode 13 in a left arrow direction in FIG. 10.

According to this, the negative electrode terminal 60 is able to consolidate the edge 13A of the negative electrode 13 such that it does not come off between the contact pieces 61 and 62 and also to surely cleave the negative electrode 13 from the edge 13A, thereby bringing it into contact with the contact pieces 61 and 62.

In addition, according to the non-aqueous electrolyte secondary battery of the third embodiment, the same effects as in the non-aqueous electrolyte secondary battery 10 of the first embodiment can be obtained.

Fourth Embodiment

Figure 11:
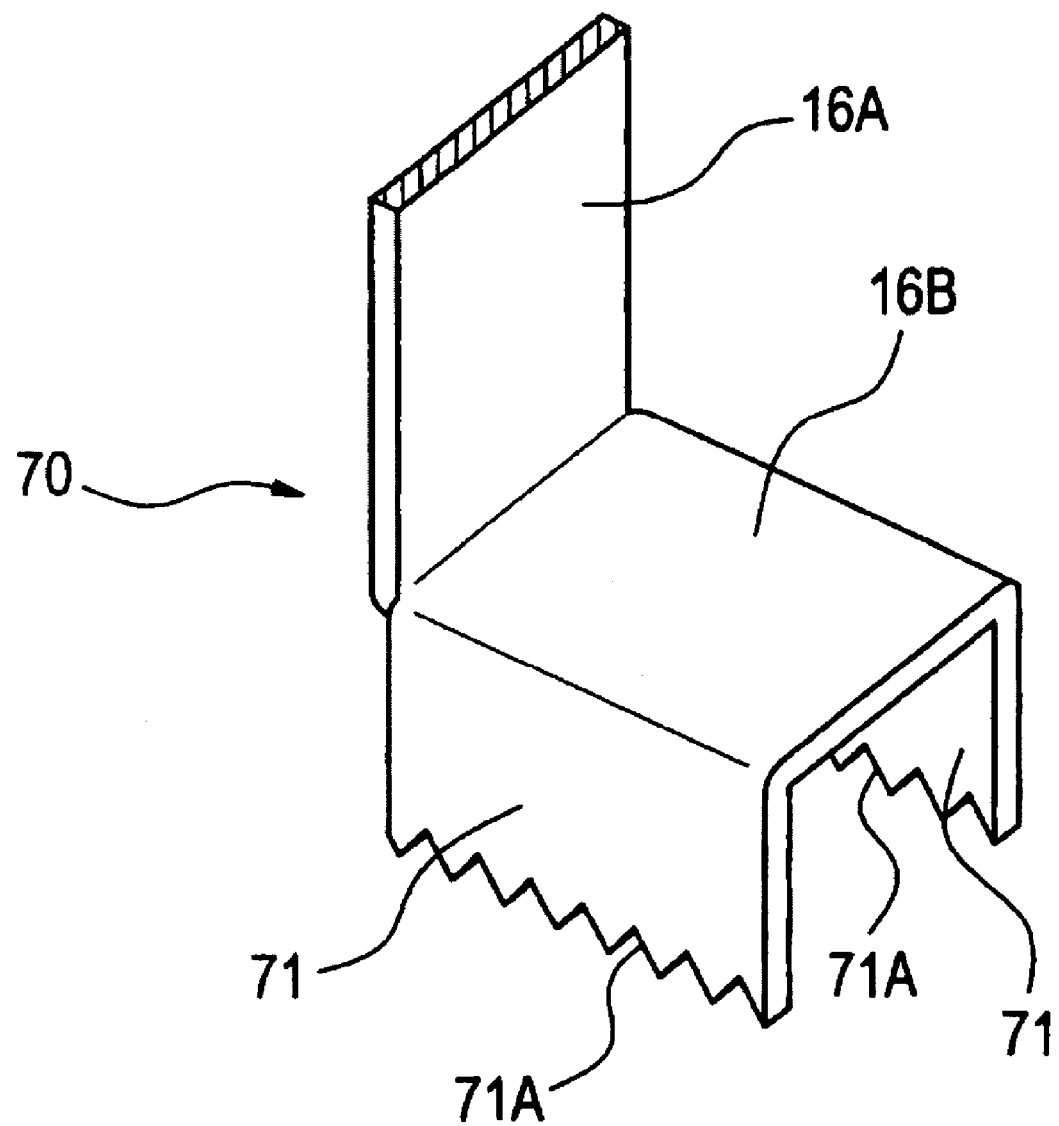
FIG. 11 is a perspective view illustrating a negative electrode terminal of a non-aqueous electrolyte secondary battery according to a fourth embodiment.

In a non-aqueous electrolyte secondary battery of a fourth embodiment as illustrated in FIG. 11, a contact piece 71 is provided in place of the contact piece 31 in the first embodiment, and other configurations are the same as in the non-aqueous electrolyte secondary battery 10 of the first embodiment.

In the negative electrode terminal 70, since a lower side 71A of a contact piece 71 is shaped in a saw-toothed form, it is possible to cleave a negative electrode 13 from an edge 13A along the planar direction much more satisfactorily.

In addition, according to the non-aqueous electrolyte secondary battery of the fourth embodiment, the same effects as in the non-aqueous electrolyte secondary battery 10 of the first embodiment can be obtained.

Next, effects of the negative electrode terminal according to the embodiments are described with reference to the following Table 1.

TABLE 1

| | Positive electrode | Number of sheets of positive electrode at the time of winding | Width of separator | Negative electrode terminal | Shape of contact piece | 3 C discharge characteristic | Retention rate of 1 C 100 cycles |
|---|---|---|---|---|---|---|---|
| Comparative Example 1 | Pattern coating on both surfaces | 1 | Wider in width than negative electrode | Welded | — | 0.85 | 0.92 |
| Comparative Example 2 | Uniform coating on one surface | 2 | Narrower in width than negative electrode | Contacted | Planar plate | 0.70 | 0.62 |
| Comparative Example 3 | Uniform coating on one surface | 2 | Narrower in width than negative electrode | Contacted | Embossed | 0.84 | 0.90 |
| Example 1 | Uniform coating on one surface | 2 | Narrower in width than negative electrode | Press contacted | Pin type (52) | 0.89 | 0.95 |
| Example 2 | Uniform coating on one surface | 2 | Wider in width than negative electrode | Press contacted | Pin type (52) | 0.88 | 0.94 |
| Example 3 | Uniform coating on one surface | 2 | Narrower in width than negative electrode | Press contacted | Knife type (31) | 0.91 | 0.94 |
| Example 4 | Uniform coating on one surface | 2 | Wider in width than negative electrode | Press contacted | Knife type (31) | 0.86 | 0.94 |

As to Comparative Example 1, lithium cobaltate, PVdF, graphite and carbon black were dispersed in a proportion of 95/3/1/1 using N-methylpyrrolidone as a solvent to prepare a coating material.

This coating material was uniformly coated with a prescribed pattern on the both surfaces of an aluminum foil and dried to form a mixture layer. This was calendar pressed, cut out in a prescribed width and cut out in conformity with the length, and a positive electrode terminal was welded in an uncoated part to prepare a positive electrode.

On the other hand, graphite and PVdF were dispersed in a proportion of 90/10 using N-methylpyrrolidone as a solvent to prepare a coating material.

This coating material was uniformly coated with a prescribed pattern on the both surfaces of a copper foil and dried to form a mixture layer. This was calendar pressed, cut out in a prescribed width and cut out in conformity with the length, and a negative electrode terminal was welded in an uncoated part to prepare a negative electrode.

The positive electrode, a separator, the negative electrode and a separator were wound to obtain a battery element. In this battery element, a top insulator and a bottom insulator were aligned to form a laminate pack, followed by injecting a liquid to obtain a laminate type lithium ion battery.

The assembled battery was charged at 4.2 V and discharged to 3.0 V at a prescribed current.

As to Comparative Example 2, the coating material for positive electrode of Comparative Example 1 was uniformly coated on one surface of an aluminum foil but not with a prescribed pattern, thereby preparing a positive electrode.

On the other hand, the coating material for negative electrode of Comparative Example 1 was uniformly coated on the both surfaces of a copper foil but not with a prescribed pattern, thereby preparing a negative electrode.

The positive electrode, a separator, the negative electrode, a separator and the positive electrode were successively stacked and wound to obtain a battery element. The width dimension of the separator is smaller than that of the negative electrode and larger than that of the positive electrode.

A negative electrode terminal was aligned so as to come into contact with an edge of the negative electrode in the vertical direction to the winding direction of this battery element. Furthermore, a positive electrode terminal was brought into contact with the back surface of the positive electrode, namely a site where the aluminum foil was exposed. Other configurations are the same as in Comparative Example 1.

The assembled battery was charged at 4.2.V and discharged to 3.0 V at a prescribed current.

As to Comparative Example 3, a positive electrode and a negative electrode were prepared, respectively in the same manner as in Comparative Example 2, and the positive electrode and the negative electrode were wound in the same manner as in Comparative Example 2, thereby obtaining a battery element.

The battery element is the same as in Comparative Example 2, except for setting up the relationship in width dimension between the separator and the negative electrode as shown in Table 1.

A negative electrode terminal was aligned so as to come into contact with an edge of the negative electrode in the vertical direction to the winding direction of this battery element; and in the negative electrode, the site coming into contact with the edge of the negative electrode was shaped in an embossed form.

The negative electrode terminal in an embossed form was aligned so as to intrude into the edge of the negative electrode.

The assembled battery was charged at 4.2 V and discharged to 3.0 V at a prescribed current.

As to Examples 1 to 4, a battery element was manufactured in the same manner as in Comparative Example 3.

The battery element is the same as in Comparative Example 2, except for setting up the relationship in width dimension between the separator and the negative electrode as shown in Table 1.

In Examples 1 to 2, the contact piece of the second embodiment was used. That is, the contact piece was shaped in a pin type, and the edge of the negative electrode was pierced by the pin type contact piece.

In Examples 3 to 4, the contact piece of the first embodiment was used. That is, the contact piece was shaped in a knife type, and the edge of the negative electrode was cloven by the knife type contact piece.

Each of the assembled batteries was charged at 4.2 V and discharged to 3.0 V at a prescribed current.

Charge characteristic and retention rate of Comparative Examples 1 to 3 and Examples 1 to 4 are shown in Table 1.

It was noted that by configuring a combination of two sheets of one surface-coated positive electrode and one sheet of both surface-coated negative electrode and in addition thereto, devising the current collection structure using a pin type contact piece or a knife type contact piece as in the first embodiment or the second embodiment as in Examples 1 to 4, higher performance than that in Comparative Example 1 can be exhibited.

According to this, in Examples 1 to 4, it is not necessary to provide the positive electrode collector with a site where a positive electrode active material is not coated or to provide the negative electrode collector with a side where a negative electrode active material is not coated for the purpose of connecting the positive electrode terminal and the negative electrode terminal to the positive electrode and the negative electrode, respectively as in Comparative Example 1.

In consequence, in Examples 1 to 4, not only it is possible to devise to reduce the labor for coating the positive electrode active material 22 on the positive electrode collector 21, but it is possible to devise to reduce the labor for coating the negative electrode active material 25 on the negative electrode collector 24. Thus, it is possible to reduce the costs or to ensure the productivity.

While in the foregoing first to fourth embodiments, the winding type has been exemplified as the battery element 11, it is not limited thereto. For example, a stack type battery element can also be applied.

The embodiments are favorably applicable to a non-aqueous electrolyte secondary battery having a battery element having a positive electrode and a negative electrode stacked therein via a separator, in which a positive electrode terminal is connected to the positive electrode, and a negative electrode terminal is connected to the negative electrode.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte secondary battery comprising:
   a battery element in which a positive electrode having a positive electrode active material layer provided on a positive electrode collector and a negative electrode having a negative electrode active material layer provided on a negative electrode collector are stacked via a separator, and an edge of the negative electrode is disposed so as to protrude along a planar direction relative to an edge of the positive electrode;
   a positive electrode terminal connected to the positive electrode; and
   a negative electrode terminal connected to the negative electrode;
   the negative electrode terminal having a contact piece intersecting with a continuous direction of the edge of the negative electrode and intersecting with the planar direction of the negative electrode, and
   the contact piece cleaving and contacting a plurality of the edges of the negative electrode.

2. The non-aqueous electrolyte secondary battery according to claim 1, wherein the contact piece cleaves the negative electrode from the edge along the planar direction and comes into contact with the negative electrode.

3. The non-aqueous electrolyte secondary battery according to claim 2, wherein a plurality of contact pieces are provided, and the contact pieces are disposed in parallel to each other.

4. The non-aqueous electrolyte secondary battery according to claim 1, wherein the contact piece penetrates the negative electrode in a thickness direction.

5. The non-aqueous electrolyte secondary battery according to claim 1, wherein the negative electrode active material layer is provided on both surfaces of the negative electrode collector.

6. The non-aqueous electrolyte secondary battery according to claim 1,
wherein the positive electrode comprises a first positive electrode and a second positive electrode, the positive electrode active material layer comprises a first positive electrode active material layer and a second positive electrode active material layer and the positive electrode collector comprises a first positive electrode collector and a second positive electrode collector, and
wherein the first positive electrode active material layer is provided on one surface of the first positive electrode collector and the second positive electrode material layer is provided on one surface of the second positive electrode collector.

7. The non-aqueous electrolyte secondary battery according to claim 6, wherein the first positive electrode, the negative electrode and the second positive electrode are stacked and then wound such that the positive electrode active material layer on the respective positive electrode face the negative electrode active material layer via the separator.

8. The non-aqueous electrolyte secondary battery according to claim 2, wherein the contact piece has any one of a knife configuration, a pin type configuration, a rising gradient configuration and a saw tooth configuration.

* * * * *